United States Patent
Kim et al.

(10) Patent No.: US 6,599,980 B2
(45) Date of Patent: Jul. 29, 2003

(54) AQUEOUS COATING COMPOSITION AND COATED ARTICLE

(75) Inventors: Juhan Kim, Ann Arbor, MI (US); Jeffrey Makarewicz, Ann Arbor, MI (US); Mamoru Kozaki, Toyota (JP); Kenichi Yasunaga, Toyota (JP); Jesse Fritcher, Lansing, IL (US); Takashi Watanabe, Hirakata (JP)

(73) Assignees: Toyota Technical Center, U.S.A., Inc., Ann Arbor, MI (US); Nippon Bee Research America, Inc., Lansing, IL (US); Nippon Bee Chemical Co., Ltd., Osaka (JP)

( * ) Notice: Subject to any disclaimer, the term of this patent is extended or adjusted under 35 U.S.C. 154(b) by 0 days.

(21) Appl. No.: 09/878,746

(22) Filed: Jun. 11, 2001

(65) Prior Publication Data

US 2003/0044626 A1 Mar. 6, 2003

(51) Int. Cl.$^7$ .................. C08L 23/00; C08L 23/04; C08L 33/02; C08L 33/04; C08L 35/02
(52) U.S. Cl. .................. 525/191; 525/221; 525/222; 525/240
(58) Field of Search ................ 525/221, 222, 525/191, 240

(56) References Cited

U.S. PATENT DOCUMENTS 5,169,888 A * 12/1992 Sales ............... 524/267
6,225,402 B1 * 5/2001 O'Callaghan et al. ...... 524/834

FOREIGN PATENT DOCUMENTS

JP    7-26088 A    1/1995

* cited by examiner

Primary Examiner—Nathan M. Nutter
(74) Attorney, Agent, or Firm—Haugen Law Firm PLLP

(57) ABSTRACT

The present invention provides: a coating composition, with which a 1-coat finish of plastic materials such as polyolefin materials can be performed, and which is aqueous and can be baked at 70° C. for 5 min. to have the following performance: high adhesion, excellent beef tallow resistance and alkaline resistance; and a coated article. The aqueous coating composition comprises: a poly(propylene chloride) resin emulsion including an poly(propylene chloride) resin which has a chlorine content of 15 to 25 weight % and a maleic anhydride moiety content of 1.0 to 5.0 weight %; an acrylic resin emulsion including an acrylic resin which is obtained by modifying the poly(propylene chloride) resin of 0 to 30 weight % and has a glass transition temperature of not lower than 90° C.; a polycarbodiimide crosslinking agent; and a resin powder. An article is coated with the above aqueous coating composition.

2 Claims, No Drawings

AQUEOUS COATING COMPOSITION AND COATED ARTICLE

BACKGROUND OF THE INVENTION

A. Technical Field

The present invention relates to an aqueous coating composition which has excellent properties to plastic materials, and a coated article.

B. Background Art

Plastic materials utilized for automotive interior parts include polypropylene (PP), acrylonitrile-butadiene-styrene (ABS), poly(phenylene oxide) (PPO) and polycarbonate (PC). In recent years, polyolefin materials have been used often in view of cost and recyclability.

Coatings designed for interior parts are applied to these plastic materials. However, it is difficult for a paint to have good properties on polyolefin materials, because the polyolefin materials have low polarity.

In order for a coating to have good properties on the polypropylene materials, a coating composition is generally formulated using a poly(propylene chloride) resin and an organic solvent. The organic solvent forms uniform coating films and improves adhesion by swelling the materials.

However, organic solvents are also troublesome substances for working environments and fire, and besides are a cause of pollution. Organic solvents are being strictly regulated worldwide.

Accordingly, the development of aqueous coating compositions is very necessary.

Beef tallow resistance and chemical resistance such as alkaline resistance will be demanded for automotive uses.

SUMMARY OF THE INVENTION

A. OBJECT OF THE INVENTION

An object of the present invention is to provide: an aqueous coating composition, with which a 1-coat finish of plastic materials such as polyolefin materials can be performed, and which is aqueous, has high adhesion, and is excellent in beef tallow resistance and alkaline resistance; and a coated article.

B. DISCLOSURE OF THE INVENTION

The present inventors made various experiments to solve the abovementioned problems. As a result, they completed the present invention by verifying that, if an emulsion type is used as the poly(propylene chloride) resin, and if the chlorination degree and maleic anhydride moiety content thereof are adjusted to a specific ratio, and if this poly (propylene chloride) resin is combined with an emulsion of the acrylic resin or the acrylic resin modified by a small amount of poly(propylene chloride) having a high glass transition temperature within the specific ratio range, and with polycarbodiimide as a crosslinking agent, and further with a resin powder, then the amount of the organic solvent as used can be diminished, and further, the 1-coat finish of the plastic materials such as polyolefin materials can be performed, and the beef tallow resistance and chemical resistance such as alkaline resistance can also be enhanced.

An aqueous coating composition, according to the present invention, comprises: a poly(propylene chloride) resin emulsion including a poly(propylene chloride) resin which has a chlorine content of 15 to 25 weight % and a maleic anhydride moiety content of 1.0 to 5.0 weight %; an acrylic resin emulsion including an acrylic resin which is obtained by modifying the poly(propylene chloride) resin of 0 to 30 weight % and has a glass transition temperature of not lower than 90° C.; a polycarbodiimide crosslinking agent; and a resin powder, wherein: the nonvolatile solid content of the poly (propylene chloride) resin emulsion is in the range of 10 to 30 weight %, the nonvolatile solid content of the acrylic resin emulsion is in the range of 40 to 65 weight %, the nonvolatile solid content of the polycarbodiimide crosslinking agent is in the range of 5 to 25 weight %, of the entirety of the nonvolatile solid content of the poly(propylene chloride) resin emulsion, the acrylic resin emulsion, and the polycarbodiimide crosslinking agent, and wherein: the content of the resin powder is in the range of 5 to 10 weight % of the nonvolatile solid content of the aqueous coating composition except the resin powder.

A coated article, according to the present invention, is coated with the aqueous coating composition.

These and other objects and the advantages of the present invention will be more fully apparent from the following detailed disclosure.

DETAILED DESCRIPTION OF THE INVENTION

The aqueous coating composition, according to the present invention, comprises a resin emulsion as an essential component, wherein the resin emulsion includes a poly (propylene chloride) resin emulsion and an acrylic resin emulsion, and further comprises a polycarbodiumide crosslinking agent and a resin powder.

In the present invention, usually, the poly(propylene chloride) resin and the acrylic resin are emulsified separately from each other, and then mixed together.

As to the above resin emulsion, the poly(propylene chloride) resin or acrylic resin is particularly dispersed in an aqueous medium, and the particle surfaces thereof are stabilized with additives such as emulsifiers, surfactants, or dispersants.

(Poly(propylene Chloride) Resin):

The poly(propylene chloride) resin, which is included in the poly(propylene chloride) resin emulsion as used in the present invention, is a polypropylene derivative comprising polypropylene chloride moiety (a1) and maleic anhydride moiety (a2) as bonded to moiety (a1).

Polypropylene chloride moiety (a1) is a moiety comprising a polypropylene including a substituent chlorine. In addition, maleic anhydride moiety (a2) comprises a group as derived from maleic anhydride, and is a modified moiety as obtained by graft.

The chlorine content of the poly(propylene chloride) resin is in the range of 15 to 25 weight %. In the case where the chlorine content is less than the above range, the emulsification is difficult. In the case where the chlorine content is more than the above range, not only the adhesion to propylene materials but also the beef tallow resistance is inferior.

The maleic anhydride moiety content is in the range of 1.0 to 5.0 weight %. In the case where the maleic anhydride moiety content is less than the above range, the emulsification is difficult. In the case where the maleic anhydride moiety content is more than the above range, the adhesion to propylene materials is inferior.

The weight-average molecular weight of the poly (propylene chloride) resin is not especially limited, but is preferably in the range of 30,000 to 100,000. In the case where the weight-average molecular weight is less than 30,000, the beef tallow resistance is inferior. On the other hand, in the case where the weight-average molecular weight is more than 100,000, the emulsification is difficult.

The poly(propylene chloride) resin is obtained by the internal modification of a polypropylene which is allowed to react with maleic anhydride and chlorine, and is, for example, produced by reacting chlorine and maleic anhydride upon a polypropylene, wherein either of the chlorine and the maleic anhydride may be reacted earlier upon the polypropylene. The reaction with chlorine is, for example, carried out by introducing a chlorine gas into a solution including a polypropylene. In addition, the reaction with maleic anhydride is, for example, carried out by reacting the maleic anhydride upon a polypropylene (or polypropylene chloride) in the presence of a peroxide.

(Acrylic Resin):

Because the above poly(propylene chloride) has a low level of coating film strength and weather resistance, the acrylic resin, which is included in the acrylic resin emulsion as used in the present invention, is a component to make up for this and to provide the beef tallow resistance and the solvent resistance along with the coating film strength and the weather resistance to the present invention aqueous coating composition.

The acrylic resin may be a pure acrylic resin as explained below, but may be a resin obtained by modifying a pure acrylic resin with the above poly(propylene chloride). The amount as modified is in the range of 0 to 30 weight %. In the case where the amount is more than this range the beef tallow resistance is inferior.

The pure acrylic resin is a resin obtained by homopolymerizing or copolymerizing acrylic monomers.such as (meth)acrylic acid, (meth)acrylic monomers containing a hydroxyl group, (meth)acrylic acid esters and (meth)acrylonitrile. In short, the pure acrylic resin means a styrene free acrylic resin. The reason is that styrene deteriorates the solvent resistance and beef tallow resistance.

Specifically, the pure acrylic resin is obtained by homopolymerizing or copolymerizing acrylic monomers containing a hydroxyl group, a carboxyl group, or an ester group. Examples of the acrylic monomer containing a hydroxyl group include 2-hydroxyethyl (meth)acrylate, 3-hydroxypropyl (meth)acrylate, 4-hydroxybutyl (meth)acrylate, and ε-caprolactone adducts thereof. Examples of the acrylic monomer containing a carboxyl group include (meth)acrylic acid. Examples of the acrylic monomer containing an ester group include methyl (meth)acrylate, ethyl (meth)acrylate, butyl (meth)acrylate, isobutyl (meth)acrylate, and isobornyl (meth)acrylate.

The acrylic resin has a glass transition temperature of not lower than 90° C. In the case where the glass transition temperature is lower than 90° C., there are disadvantages in that the beef tallow resistance is inferior.

(Emulsification):

The poly(propylene chloride) resin or acrylic resin has so high hydrophobicity as to be difficult to stably disperse into water. Thus, the poly(propylene chloride) resin or acrylic resin is emulsified with an emulsifier or basic substance.

The content of the emulsifier is fitly set in accordance with the content of the poly(propylene chloride) resin, the acrylic resin, the basic substance, or water, but, for example, in the case of the poly(propylene chloride) resin, the content of the emulsifier is preferably in the range of 3 to 40 parts by weight, more preferably 10 to 25 parts by weight, per 100 parts by weight of the resin. In the case where the ratio of the emulsifier is less than 3 parts by weight, the storage stability of the emulsion is not so much better, and further, the aggregation or precipitation easily occurs on the way to emulsification or polymerization in the below-mentioned production process for the emulsion. On the other hand, in the case where the ratio of the emulsifier is more than 40 parts by weight, a large amount of emulsifier remains in the coating film, with the result that the water resistance or weather resistance of the coating film is deteriorated.

The emulsifier is not especially limited, but examples thereof include: nonionic emulsifiers such as polyoxyethylene alkyl ethers, polyoxyethylene alkyl phenol ethers, polyoxyethylene aliphatic esters, polyoxyethylene polyhydric alcohol fatty acid esters, polyhydric alcohol fatty acid esters, polyoxyethylene propylene polyols, and alkylolamides; anionic emulsifiers such as alkylsulfate ester salts, alkylphenolsulfonic acid salts, and sulfosuccinic acid esters; amphoteric emulsifiers such as alkylbetaines and alkylimidazolines; resin type emulsifiers such as polyoxyethylene-group-containing urethane resins and carboxylate-salt group-containing urethane resins; and cationic emulsifiers such as imidazoline laurate, lauryltrimethylammonium chloride, stearylbetaine, and distearyldimethylammonium chloride. These may be used either alone respectively or in combinations with each other. Among these, the nonionic emulsifiers are preferable, because they have no ionic polar group of high hydrophilicity and therefore make the water resistance of the coating film good.

As to the emulsifier, reactive emulsifiers are also usable in addition to the above-mentioned non-reactive emulsifiers. The joint use of the reactive emulsifier with the non-reactive emulsifier enhances the water resistance of the coating film. The reactive emulsifier, for example, contains a reactive group, such as radical-polymerizable unsaturated bond, as well as a hydrophilic group (e.g. polyethylene oxide group, hydroxyl group, carboxyl group, sulfonic acid group, sulfuric acid group, amino group) and a hydrophobic group (e.g. alkyl group, phenyl group, fluoroalkyl group, polysiloxane group). Examples of the reactive emulsifier include: Adeka Reasoap NE-10, NE-20, NE-30 having an allyl ether group, a polyethylene oxide group and a nonylphenyl group (made by Asahi Denka Kogyo K.K.); SE-10N having an allyl ether group, a polyethylene oxide group, a sulfuric acid group and a nonylphenyl group (made by Asahi Denka Kogyo K.K.); NOIGEN RN-20, RN-30, RN-50 having a propenyl group on a phenyl group in a polyoxyethylene nonyl phenyl ether group (made by Dai-ichi Kogyo Seiyaku Co., Ltd.); HS-10, HS-20 having a propenyl group on a phenyl group in a polyoxyethylene nonyl phenyl ether sulfate ester group (made by Dai-ichi Kogyo Seiyaku Co., Ltd.); S-120A, S-180A having an allyl group and a sulfonic acid group (made by Kao Corporation); and compounds having a methacryloyl group or acryloyl group (made by NIPPON NYUKAZAI Co., Ltd.), such as Antox MS-60 (=bis(polyoxyethylene polycyclic phenyl ether) methacrylate sulfate ester salt), RMA-564, RMA-568, RMA-506 (=polyoxyethylene nonyl phenyl ether acrylates), RMA-1120, MPG130-MA (=polyoxyethylene alkyl ether methacrylates), and MA-30, MA-50, MA100 (=polyoxyethylene methacrylate esters). These may be used either alone respectively or in combinations with each other.

The content of the basic substance, used as a neutralizer, is also adjusted in accordance with the content of the poly(propylene chloride) resin, the acrylic resin, the emulsifier, or water. Particularly, the content of the basic substance is determined in consideration of sufficiently neutralizing an acidic functional group in a resin such as poly(propylene chloride) resin or emulsifier, but is, for example, in the range of 0.1 to 5 weight % of the entirety of the emulsion. The pH of the emulsion, determined by combining the basic substance, is preferably in the range of 7 to 11, more preferably 7.5 to 10.5, most preferably 8 to 10. In the case where the pH of the emulsion is less than 7, the neutralization is not sufficient, therefore the storage stability of the emulsion might be not so much better. On the other hand, in the case where the pH of the emulsion is more than 11, an excess of free basic substance exists in the emulsion. Therefore the emulsion has so strong a smell of amine as to be difficult to use.

The basic substance, used in the present invention, adds to the maleic anhydride group and/or neutralizes these groups, thereby serving to enhance the hydrophilicity of the poly(propylene chloride) and, as a result, to improve the storage stability of the emulsion.

The basic substance is not especially limited, but examples thereof include at least one of an amine compound and ammonia. Examples of the amine compound include: monoamines such as trimethylamine, triethylamine, butylamine, dibutylamine and N-methylmorpholine; polyamines such as ethylenediamine, hexamethylenediamine, piperazine, isophoronediamine, triethylenediamine and diethylenetriamine; and alkanolamines such as monoethanolamine, diethanolamine, triethanolamine, N-methyldiethanolamine, N,N-dimethylethanolamine and 2-amino-2-methylpropanol. These may be used either alone respectively or in combinations with each other. These may be jointly used with ammonia.

The content of water is preferably in the range of 50 to 95 weight %, more preferably 50 to 85 weight %, most preferably 55 to 80 weight %, of the entirety of the emulsion. In the case where the content of water is less than 50 weight %, the nonvolatile solid content in the emulsion is too much; therefore the storage stability of the emulsion might be deteriorated due to easy occurrence of such as aggregation. On the other hand, in the case where the content of water is more than 95 weight %, the workability is inferior in the production process for the emulsion, and further, the production of the aqueous coating composition is restricted.

The average particle diameter of polymer particles including a major proportion of poly(propylene chloride) resin or acrylic resin in the emulsion is not especially limited, but is preferably in the range of 0.01 to 10 $\mu$m, more preferably 0.03 to 5 $\mu$m, most preferably 0.05 to 1 $\mu$m. In the case where the average particle diameter of the polymer particles is smaller than 0.01 $\mu$m, a large quantity of emulsifier is necessary; therefore the water resistance and the weather resistance of the coating film are deteriorated. On the other hand, in the case where the average particle diameter of the polymer particles is larger than 10 $\mu$m, the storage stability of the emulsion is deteriorated, and further, the volume of the polymer particles is too large; therefore much melting heat and time to form a coating film is necessary, and the heat flowability is deteriorated, and the properties of the coating film such as appearance, water resistance and solvent resistance might be deteriorated.

(Polycarbodiimide Crosslinking Agent):

The polycarbodiimide crosslinking agent is a component which enhances the alkaline resistance because the crosslinking agent reacts with the poly(propylene chloride) resin or acrylic resin.

Examples of the polycarbodiimide crosslinking agent include: XL29SE made by UCC, Carbodilite E-01 made by Nisshinbo Co., Ltd., and Aromatic carbodiimide made by Rohm & Haas Company.

(Resin Powder):

The resin powder enhances the alkaline resistance, and is especially effective in improving blister resistance.

Examples of the resin powder include: Art Pearl U-600T made by Negami Industry Co., Ltd., and Soft Burnock CFB100, Dai Nippon Ink Co., Ltd.

(Aqueous Coating Composition):

The aqueous coating composition according to the present invention comprises the poly(propylene chloride) resin emulsion, the acrylic resin emulsion, the polycarbodiimide crosslinking agent, and the resin powder as explained above in detail as essential components, and may further comprise other components as mentioned below.

The nonvolatile solid content of the poly(propylene chloride) resin emulsion as included in the aqueous coating composition according to the present invention, is in the range of 10 to 30 weight %, preferably 15 to 25 weight %, of the entirety of the nonvolatile solid content of the poly(propylene chloride) resin emulsion, the acrylic resin emulsion, and the polycarbodiimide crosslinking agent. In the case where the nonvolatile solid content of the poly(propylene chloride) resin emulsion is less than 10 weight %, the adhesion to materials is inferior. On the other hand, in the case where the nonvolatile solid content of the poly(propylene chloride) resin emulsion is more than 30 weight %, the beef tallow resistance is inferior.

The nonvolatile solid content of the acrylic resin emulsion as included in the aqueous coating composition according to the present invention, is in the range of 40 to 65 weight %, preferably 45 to 65 weight %, of the entirety of the nonvolatile solid content of the poly(propylene chloride) resin emulsion, the acrylic resin emulsion, and the polycarbodiimide crosslinking agent. In the case where the nonvolatile solid content of the acrylic resin emulsion is less than 40 weight %, the contamination resistance such as the beef tallow resistance is inferior. On the other hand, in the case where the nonvolatile solid content of the acrylic resin emulsion is more than 65 weight %, the adhesion to polypropylene materials is inferior.

The nonvolatile solid content of the polycarbodiimide crosslinking agent as included in the aqueous coating composition according to the present invention, is in the range of 5 to 25 weight %, preferably 10 to 25 weight %, of the entirety of the nonvolatile solid content of the poly(propylene chloride) resin emulsion, the acrylic resin emulsion, and the polycarbodiimide crosslinking agent. In the case where the nonvolatile solid content of the polycarboduimide crosslinking agent is less than 5 weight %, the alkaline resistance is inferior. On the other hand, in the case where the nonvolatile solid content the polycarbodiumide crosslinking agent is more than 25 weight %, there are disadvantages in that the beef tallow resistance is inferior.

The content of the resin powder as included in the aqueous coating composition according to the present invention, is in the range of 5 to 10 weight % of the nonvolatile solid content of the aqueous coating composition except the resin powder. In the case where the content of the resin powder is less than 5 weight %, the alkaline resistance is inferior. On the other hand, the content of the resin powder is more than 10 weight %, there are disadvantages in that the adhesion is inferior.

(Other Components):

As to the present invention aqueous coating composition, other aqueous resins can fitly be combined, if necessary. Water-soluble acrylic resins are the most preferable of the above other aqueous resins, but emulsions of resins other than the water-soluble acrylic resins, such as polyester resin emulsions, polyurethane resin emulsions, epoxy resin emulsions, or amino resin emulsions, may also be combined.

The aqueous coating composition, according to the present invention, can further comprise other components which are usually added to coatings, if necessary. Examples thereof include: colorants; fillers such as talc; brilliant pigments such as aluminum flake and mica; additives such as surfactants, neutralizers, stabilizers, thickeners, defoamers, surface conditioners, ultraviolet absorbents, and antioxidants; inorganic fillers such as silica; conductive fillers such as conductive carbon, conductive fillers, and metal powders; and auxiliary components such as organic reformers, and plasticizers.

Examples of colorants, which may be mixed into the present invention aqueous coating composition, include: inorganic pigments such as titanium oxide, carbon black, iron oxide, chromium oxide, and Prussian blue; organic pigments such as azo pigments, anthracene pigments, perylene pigments, quinacridone pigments, indigo pigments, and phthalocyanine pigments; and dyes.

The aqueous coating composition, according to the present invention, can further comprise an organic solvent if the ratio thereof is not more than 30 weight % of the aqueous coating composition. The inclusion of the organic solvent improves the workability and enhances the dispersibility of additives such as pigments. However, generally, the absence of the organic solvent has more advantages by enhancing the storage stability of the emulsion and complying with recent regulations on organic solvents.

Examples of the organic solvent include: aromatic hydrocarbons such as toluene and xylene; aliphatic hydrocarbons such as hexane, heptane and octane; alicyclic hydrocarbons such as cyclohexane, methylcyclohexane and cyclopentane; esters such as ethyl acetate, n-butyl acetate, isobutyl acetate and amyl acetate; ethers such as n-butyl ether and isobutyl ether; ketones such as acetone, methyl ethyl ketone, methyl isobutyl ketone and cyclohexanone; alcohols such as methanol, ethanol, isopropanol, n-butanol, 2-butanol, n-propylene glycol and isopropylene glycol; cellosolves such as ethylene glycol monomethyl ether, ethylene glycol monobutyl ether and ethylene glycol monoethyl ether acetate; carbitols such as diethylene glycol monoethyl ether; propylene glycol monoalkyl ethers such as propylene glycol monomethyl ether, propylene glycol monoethyl ether and propylene glycol monobutyl ether; and other solvents such as dioxane, N-methylpyrrolidone, dimethylformamide and diacetone alcohol.

(Objective Materials):

The plastic material, which is an object to which the present invention aqueous coating composition is coated, is not especially limited, but examples thereof include: polyolefins such as polypropylene (PP) and polyethylene (PE); acrylonitrile-styrene (AS), acrylonitrile-butadiene-styrene (ABS), poly(phenylene oxide) (PPO), poly(vinyl chloride) (PVC), polyurethane (PU) and polycarbonate (PC).

(Coating Method):

The method for coating the present invention aqueous coating composition onto the above objective material may be performed either by air spray or airless spray.

The aqueous coating composition is, for example, coated such that the dried-film thickness will be preferably in the range of 10 to 50 μm, more preferably 15 to 25 μm. In the case where the dried-film thickness is less than 10 μm, the thickness might be too thin to obtain a uniform film. On the other hand, in the case where the dried-film thickness is more than 50 μm, there tends to occur problems such as coating film cracking.

The step of curing the coating film may be carried out at room temperature, but is preferably carried out by heating at 60 to 80° C. to improve physical properties.

The coated article according to the present invention as obtained in the above way, is coated with the aqueous coating composition according to the present invention. Therefore, the coating film has high adhesion, and is excellent in beef tallow resistance and alkaline resistance.

(Effects and Advantages of the Invention):

The aqueous coating composition, according to the present invention, enables a 1-coat finish of plastic materials such as polyolefin materials, to be performed with this aqueous coating composition, and is aqueous. The coating film as obtained from this composition has high adhesion and is excellent in beef tallow resistance and alkaline resistance.

The coated article, according to the present invention, is covered with the coating film as obtained from the above aqueous coating composition. Therefore, the coating film has high adhesion, and the coated article is excellent in beef tallow resistance and alkaline resistance.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples. In addition, hereinafter, the units "part(s)" and "%" are by weight.

Poly(propylene chloride) resin emulsion A and acrylic resin emulsions B1 to B6, used in the Examples and the Comparative Examples, were produced in the following way.

(Production Example A1; Production of Poly(propylene Chloride) Resin Emulsion A):

First, 24.6 parts of poly(propylene chloride) resin (chlorine content: 22 weight %, maleic anhydride moiety content: 1.5 weight %, and weight average molecular weight: 60,000), 5.5 parts of an emulsifier (Igepal CO-730, made by Rhone-Poulenc Chimie), and 9.4 parts of xylene were placed into a four-necked flask as equipped with a stirrer. The charged mixture was heated to 90° C. After the charged mixture was dissolved uniformly, 0.45 part of N-methylmorpholine was added thereto while maintaining the temperature at 85° C. At the same time, 59.95 parts of deionized water were dropped. After the completion of dropping, the resultant mixture was stirred for one hour, thus obtaining poly(propylene chloride) resin emulsion A having a nonvolatile solid content of 30%.

(Production Example B1; Production of Acrylic Resin Emulsion B1):

First, 33 parts of deionized water and 1 part of an emulsifier (Dupanol WAQE, made by Witco Corporation) were placed into a four-necked flask as equipped with a stirrer, and the resultant mixture was heated to 70° C. in a stream of nitrogen while stirring. Separately, an emulsified solution and an initiator solution were prepared, wherein the emulsified solution was obtained beforehand by emulsifying 20 parts of deionized water, 3 parts of the emulsifier, and the entirety of the acryl monomer components as listed in Table 1, and wherein the initiator solution comprised 4.2 parts of deionized water and 0.2 part of ammonium persulfate. These were added dropwise at 70° C. over a period of 2.5 hours, and further, the reaction is continued for 2 hours, thus obtaining acrylic resin emulsion B1 having a nonvolatile solid content of 40%. The transition temperature (° C.) of the acrylic resin moiety and the poly(propylene chloride) resin moiety content (%) in emulsion B1as obtained are listed in Table 1.

(Production Examples B2 to B6; Production of Acrylic Resin Emulsions B2 to B6):

Acrylic resin emulsions B2 to B6 were produced in the same way as of Production Example B1, except that each acryl monomer component was changed to the component as listed in Table 1, and that the entirety of the poly (propylene chloride) resin was added to the acryl components in the case of modification with the poly(propylene chloride) resin. The transition temperature (° C.) of the acrylic resin moiety and the poly(propylene chloride) resin moiety content (%) in emulsions B1 to B6 as obtained are listed in Table 1.

TABLE 1

| | Production Example | | | | | |
|---|---|---|---|---|---|---|
| Content (part) | B1 | B2 | B3 | B4 | B5 | B6 |
| Deionized water | 57.2 | 57.2 | 57.2 | 57.2 | 57.2 | 57.2 |
| Emulsifier | 4.0 | 4.0 | 4.0 | 4.0 | 4.0 | 4.0 |
| Methyl methacrylate *1 | 13.6 | 8.6 | 13.6 | 13.6 | 22.2 | 9.2 |
| Isobornyl methacrylate *2 | 13.6 | 18.6 | 18.6 | 18.0 | 5.0 | 9.2 |
| Glycidyl methacrylate *3 | 11.4 | 11.4 | 5.4 | 0 | 11.4 | 7.9 |
| Poly(propylene chloride) resin | 0 | 2.0 | 6.0 | 12.0 | 0 | 14.0 |
| Ammonium persulfate | 0.2 | 0.2 | 0.2 | 0.2 | 0.2 | 0.2 |
| Total of the above components | 100 | 102 | 105 | 105 | 100 | 101.7 |
| Tg of acrylic resin moiety (° C.) | 95 | 103 | 114 | 129 | 80 | 95 |
| Poly(propylene chloride) resin moiety content (%) | 0 | 5 | 14 | 28 | 0 | 35 |

*1 to *3: Acryl monomer component

EXAMPLE 1

Preparation of Pigment Paste 56.4 parts of titanium dioxide, 1.8 parts of carbon black, and 41.8 parts of a water-soluble acrylic resin (nonvolatile solid content: 20%, made by Rohm & Haas Company) were dispersed with a sand mill for 30 minutes, thus obtaining a pigment paste having a nonvolatile solid content of 67%.

Preparation of Aqueous Coating Composition

After 112.5 parts of emulsion B1 was added to a blending vessel, the following components were added thereto in turn and blended while dispersive stirring. The components were 104 parts of a water-soluble acrylic resin (nonvolatile solid content: 20%, made by Rohm & Haas Company), 100 parts of emulsion A, 92.5 parts of the pigment paste, 70.9 parts of N-methylpyrrolidone, 140 parts of deionized water, 139.9 parts of talc, 17.0 parts of a resin powder (ART PEARL U-600T, made by Negami Industry Co., Ltd.), 9.6 parts of a wax (nonvolatile solid content: 35%, made by Rohm & Haas Company), 2.5 parts of a defoamer (Surfinol 104, nonvolatile solid content: 50%, made by Air Products), and 28.2 parts of a thickener (ASE-60, nonvolatile solid content: 20%, made by Rohm & Haas Company). After dispersing the components, the maturation reaction was carried out for one hour. Then, 62.5 parts of a polycarbodiimde crosslinking agent (Carbodilite E-01, nonvolatile solid content: 40%, made by Nisshinbo Co., Ltd.) and 40.5 parts of deionized water were further added thereto while stirring, thus obtaining aqueous coating composition (1) having a nonvolatile solid content of 40%.

Evaluation for Aqueous Coating Composition

After washing a polypropylene test piece, aqueous coating composition (1) was air-spray-coated onto the test piece and cured at 70° C. for 5 minutes such that the dried-film thickness would be 20 mm, thus obtaining a test piece covered with the coating film.

The properties of the resultant coating film were evaluated by the below evaluation method and the results were shown in Table 2.

(Adhesion):

A hundred pieces of checkerboard squares were made at intervals of 1 mm on the coating film with a cutter knife, and then the peeling test was carried out with an adhesive tape.

○: All the hundred pieces of checkerboard squares remained on the test piece.

X: One or more pieces of checkerboard squares were peeled off from the test piece.

(Beef Tallow Resistance):

The coating film was uniformly coated with the cow grease (reagent), and flannel cloth was placed thereon. Then, the test piece was left in an electric oven of 80° C. for one week. When one week passed, the test piece was taken out, and washed and air-dried. Then, a cross having 2 cm length was marked on the coating film, and the peeling test was carried out.

○: Extraordinariness was not observed.

X: The coating film was observed to be peeled off.

(Alkaline Resistance):

A polyethylene cylinder was placed on the coating film, and 5 ml of an aqueous sodium hydroxide solution of 0.1 N was added dropwise thereto. The upper opening portion was covered with a glass plate, and the test piece was left in a thermoregulator of 55° C. for 4 hours. Then, the cylinder was taken off, and the coating film was washed and air-dried. The situation change of the coating film was observed.

○: The portion in contact with the aqueous sodium hydroxide solution was not different from the portion not in contact with it.

X: The portion in contact with the aqueous sodium hydroxide solution discolored, and decreased gloss. Extraordinariness such as blistering was observed.

EXAMPLES 2 to 6 AND COMPARATIVE EXAMPLES 1 TO 7

Aqueous coating compositions (2) to (6) and comparative aqueous coating compositions (1) to (7) were produced in the same way as of Example 1 except that the content and kind of the component were changed according to Tables 2 and 3. Incidentally, the nonvolatile solid content of the entirety of emulsion A, emulsion B and the polycarbodiimide crosslinking agent in Examples 2 to 6 and Comparative Examples 1 to 7 was the same as that in Example 1. In addition, the content of each component except emulsion A, emulsion B, the polycarbodiimide crosslinking agent, and the resin powder was not changed in Examples 2 to 6 and Comparative Examples 1 to 7. The aqueous coating compositions and comparative aqueous coating compositions as obtained in Examples 2 to 6 and Comparative Examples 1 to 7 were evaluated in the same way as of Example 1. The results are shown in Tables 2 and 3.

TABLE 2

| Content (part) | Example 1 | Example 2 | Example 3 | Example 4 | Example 5 | Example 6 |
|---|---|---|---|---|---|---|
| Emulsion A | 100 | 83.3 | 83.3 | 66.7 | 50 | 33.3 |
| Emulsion B1 | 112.5 | 150 | 162.5 | — | — | — |
| Emulsion B2 | — | — | — | 162.5 | — | — |
| Emulsion B3 | — | — | — | — | 162.5 | — |
| Emulsion B4 | — | — | — | — | — | 162.5 |
| Polydicarbodiimide crosslinking agent | 62.6 | 37.5 | 25 | 37.5 | 62.5 | 62.5 |
| Total of the above components | 275 | 270.8 | 270.8 | 266.7 | 275 | 258.3 |
| Resin Powder | 17.0 | 17.0 | 17.0 | 23.2 | 33.0 | 33.0 |
| Adhesion | ○ | ○ | ○ | ○ | ○ | ○ |
| Beef tallow resistance | ○ | ○ | ○ | ○ | ○ | ○ |
| Alkaline resistance | ○ | ○ | ○ | ○ | ○ | ○ |

TABLE 3

| Content (part) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Emulsion A | 83.3 | 83.3 | 16.7 | 116.7 | 100 | 100 | 33.3 |
| Emulsion B5 | 125 | — | — | — | — | — | — |
| Emulsion B6 | — | 125 | — | — | — | — | — |
| Emulsion B1 | — | — | 175 | 100 | 100 | 112.5 | 162.5 |
| Polydicarbodiimide crosslinking agent | 62.5 | 62.5 | 62.5 | 62.5 | 75 | 62.5 | 62.5 |
| Total of the above components | 270.8 | 270.8 | 254.2 | 279.2 | 275 | 275 | 258.3 |
| Resin powder | 23.2 | 23.2 | 17.0 | 17.0 | 17.0 | 0 | 49.8 |
| Adhesion | ○ | ○ | x | ○ | x | ○ | x |
| Beef tallow resistance | x | x | ○ | x | ○ | ○ | ○ |
| Alkaline resistance | ○ | ○ | ○ | ○ | ○ | x | ○ |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous coating composition, which comprises:

a) a resin emulsion A;

b) a resin emulsion B;

c) a polycarbodiimide crosslinking agent; and d) a resin powder;

e) wherein said emulsion A comprises: a maleic-anhydride-modified chlorinated polypropylene resin emulsion that comprises a maleic-anhydride-modified chlorinated polypropylene resin which has a chlorine content of 15 to 25 weight % and a maleic anhydride modification amount of 1.0 to 5.0 weight %;

f) wherein said emulsion B comprises: an acrylic resin emulsion that comprises an acrylic resin which is obtained by modifying a pure acrylic resin with the maleic-anhydride-modified chlorinated polypropylene resin of 0 to 30 weight % based on a total amount of acryl monomer component and maleic-anhydride-modified chlorinated polypropylene resin and has a glass transition temperature of not lower than 90° C.;

g) wherein the nonvolatile solid content of the maleic-anhydride-modified chlorinated polypropylene resin emulsion is in the range of 10 to 30 weight %, the nonvolatile solid content of the acrylic resin emulsion is in the range of 40 to 65 weight %, and the nonvolatile solid content of the polycarbodiimide crosslinking agent is in the range of 5 to 25 weight %, based on an entirety of the nonvolatile solid content of the maleic-anhydride-modified chlorinated polypropylene resin emulsion, the acrylic resin emulsion, and the polycarbodiimide crosslinking agent;

h) wherein the resin powder comprises polyurethane resin particles to enhance alkaline resistance and improve blister resistance; and i) wherein the content of the resin powder is in the range of 5 to 10 weight % of the nonvolatile solid content of the aqueous coating composition except the resin powder.

2. A coated article, which is coated with the aqueous coating composition as recited in claim 1.

* * * * *